(12) United States Patent
Czarnecki (10) Patent No.: US 8,891,219 B2
(45) Date of Patent: Nov. 18, 2014

(54) OPEN NEUTRAL PROTECTION

(71) Applicant: Reliance Controls Corporation, Racine, WI (US)

(72) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 0 days.

(21) Appl. No.: 13/911,783

(22) Filed: Jun. 6, 2013

(65) Prior Publication Data

US 2014/0002940 A1    Jan. 2, 2014

Related U.S. Application Data (60) Provisional application No. 61/667,044, filed on Jul. 2, 2012.

(51) Int. Cl.

| | |
|---|---|
| *H02H 3/00* | (2006.01) |
| *H02H 5/10* | (2006.01) |
| *H02H 11/00* | (2006.01) |
| H02H 3/20 | (2006.01) |
| H02H 9/04 | (2006.01) |

(52) U.S. Cl.
CPC . *H02H 3/20* (2013.01); *H02H 5/10* (2013.01); *H02H 11/001* (2013.01)
USPC .......................................... 361/86; 361/91.1

(58) Field of Classification Search
CPC ............. H02H 3/20; H02H 9/00; H02H 9/04; H02H 9/046
USPC .......................................................... 361/86
See application file for complete search history.

(56) References Cited

U.S. PATENT DOCUMENTS

| | | | | |
|---|---|---|---|---|
| 3,269,026 | A | * | 8/1966 | Maas et al. ....................... 34/528 |
| 3,809,961 | A | | 5/1974 | Kershaw |
| 3,944,891 | A | * | 3/1976 | McDonald et al. ............. 361/77 |
| 3,987,341 | A | | 10/1976 | Clark |
| 4,067,054 | A | * | 1/1978 | Clark ........................... 361/91.5 |
| 4,574,324 | A | | 3/1986 | Packard |
| 4,598,331 | A | | 7/1986 | Legatti |
| 4,931,893 | A | | 6/1990 | Glennon et al. |
| 5,191,318 | A | | 3/1993 | Glennon |
| 7,099,130 | B2 | * | 8/2006 | Angle et al. ..................... 361/44 |
| 7,136,267 | B2 | | 11/2006 | Silverman |
| 7,161,780 | B2 | | 1/2007 | Germain et al. |
| 7,463,124 | B2 | | 12/2008 | DiSalvo et al. |
| 8,547,673 | B2 | * | 10/2013 | Natili et al. .................. 361/91.1 |

(Continued)

*Primary Examiner* — Dharti Patel
(74) *Attorney, Agent, or Firm* — Boyle Fredrickson, S.C.

(57) ABSTRACT

A switching device is configured to connect a split-phase power source to a load. The split-phase power source includes a first hot lead, a second hot lead, and a neutral lead. When the split-phase power source is generating power, the voltage between the first hot lead and the neutral lead closes a first contact and the voltage between the second hot lead and the neutral lead closes a second contact. The contacts are connected in series between the first hot lead, the second hot lead and a third switch. The voltage potential present between the first hot lead and the second hot lead closes a third and fourth contact. The third contact is connected in series between the first hot lead and the load and the fourth contact is connected in series between the second hot lead and the load. The switching device protects against open neutral conditions.

16 Claims, 4 Drawing Sheets

(56) References Cited

U.S. PATENT DOCUMENTS

| | | |
|---|---|---|
| 2007/0258175 A1 | 11/2007 | Montgomery et al. |
| 2010/0046128 A1* | 2/2010 | Wang et al. .................... 361/42 |
| 2012/0218684 A1* | 8/2012 | Andersen et al. ............. 361/601 |

* cited by examiner

OPEN NEUTRAL PROTECTION

CROSS-REFERENCE TO RELATED APPLICATIONS

This application claims priority to U.S. provisional application Ser. No. 61/667,044, filed on Jul. 2, 2012 and titled "Open Neutral Protection", the entire contents of which are expressly incorporated herein.

BACKGROUND OF THE INVENTION

The subject matter disclosed herein relates to an open neutral protection device, and more specifically, to a circuit configured to detect and to prevent an open neutral condition in a split-phase power distribution system.

Typically, utility power is delivered to the customer via a split-phase electrical distribution system. The split-phase electrical distribution system includes two "hot" wires, L1 and L2, which conduct alternating current having the same magnitude but offset by 180 degrees, and a neutral conductor, N. This split-phase electrical system is configured to supply power to alternating current (AC) loads of two different magnitudes. For example, 120 VAC loads are connected between either L1 or L2 and the neutral conductor and 240 VAC loads are connected between L1 and L2.

It is known that the utility power lines are exposed to harsh environmental conditions and can become inoperable for many reasons, such as inclement weather, ice, falling trees, animal damage, etc., which may cause a portion of the power grid to fail or blackout. Consequently, many utility power customers utilize a backup generator to power some or all of the electrical loads present at the residence or building. Because the utility power is typically delivered via a split-phase electrical distribution system, the majority of backup generators are configured to deliver power in the same manner. However, backup generators are often installed by personnel not fully trained to install the equipment, for example, maintenance personnel or homeowners, increasing the potential for incorrect wiring of the backup generator.

Although the split-phase distribution system provides flexibility for the type of load to be connected, a fundamental hazard exists if the system is wired incorrectly or if a failure of a component or connection in the neutral conduction path causes the neutral conduction path to open. If the neutral conduction path is open and loads are connected to each of the two hot leads, current no longer returns on the neutral conduction path and a voltage divider network is established between the two hot leads. As a result, the voltage present (e.g., 240 VAC) is divided proportionally between the two impedances seen in each half of the split distribution system. If the impedance of the loads present on one half of the system is significantly larger than the loads present on the other half, the majority of the voltage delivered by the utility will be present across the half of the system having the higher impedance. The electrical devices connected to that half of the system, which normally expect to receive a lower voltage potential (e.g., 120 VAC) will instead be connected to a substantially higher voltage potential, creating the potential to damage the electrical devices connected on the high voltage half of the system.

SUMMARY OF THE INVENTION

The subject matter disclosed herein relates to a switching device configured to connect a split-phase power source to a load. The switching device includes a first switch operatively connected between a first hot lead and a neutral lead from the split-phase power source, and a second switch operatively connected between a second hot lead and the neutral lead from the split-phase power source. When the split-phase power source is generating power, the voltage between the first hot lead and the neutral lead energizes the first switch and the voltage between the second hot lead and the neutral lead energizes the second switch. A first contact controlled by the first switch and a second contact controlled by the second switch are each connected in series between the first hot lead, the second hot lead and a third switch. The first and second contacts are closed when the first and second switches, respectively, are energized. A third voltage potential, present between the first hot lead and the second hot lead, energizes the third switch. Two contacts are controlled by the third switch and are closed when the third switch is energized. One of the contacts is connected in series between the first hot lead and the load, and the other of the contacts is connected in series between the second hot lead and the load. If the neutral lead is broken or otherwise opens while the split-phase power source is operating, each of the first and second switches are de-energized, opening the connection between the power source and the load. Further, if the split-phase power source is connected to the switching device incorrectly, the voltage potentials will be incorrect such that the third switch will not energize, preventing the incorrectly wired power source form being connected to the electrical load.

According to one embodiment of the invention, a switching device for connecting a power distribution system to an electrical load is disclosed. The power distribution system has a first voltage potential between a first hot lead and a neutral lead and a second voltage potential between a second hot lead and the neutral lead. The switching device includes a first switch selectively enabled as a function of the first voltage potential, a second switch selectively enabled as a function of the second voltage potential, and a third switch configured to selectively connect the first hot lead and the second hot lead to the electrical load when both the first switch and the second switch are enabled.

According to another aspect of the invention, a third voltage potential exists between the first hot lead and the second hot lead, and the third voltage potential is greater than both the first voltage potential and the second voltage potential. The third switch may be selectively enabled as a function of the third voltage potential.

According to yet another aspect of the invention, a first voltage supply is operatively connected between the first hot lead and the neutral lead and a second voltage supply is operatively connected between the second hot lead and the neutral lead. The first voltage supply is configured to enable the first switch when the first voltage potential is present between the first hot lead and the neutral lead and to disable the first switch when the first voltage potential is not present between the first hot lead and the neutral lead. The second voltage supply is configured to enable the second switch when the second voltage potential is present between the second hot lead and the neutral lead and to disable the second switch when the second voltage potential is not present between the second hot lead and the neutral lead. The first voltage supply may be a first rectifier circuit, and the second voltage supply may be a second rectifier circuit.

According to still another aspect of the invention, the first switch is a first relay, the second switch is a second relay, and the third switch is a third relay. The first relay includes a first coil and a first contact, the second relay includes a second coil and a second contact, and the third relay includes a third coil, a third contact, and a fourth contact. The first coil is energized by a first voltage potential present between the first hot lead and the neutral lead of the split-phase power distribution system. The second coil is energized by a second voltage potential present between the second hot lead and the neutral lead of the split-phase power distribution system. The first contact and the second contact are connected in series with the third coil between the first hot lead and the second hot lead. The third contact is connected in series between the first hot lead and an electrical load, and the fourth contact is connected in series between the second hot lead and the electrical load.

According to another embodiment of the invention, a switching device for protecting against an open neutral connection in a split-phase power distribution system having a first hot lead, a second hot lead, and a neutral lead is disclosed. The switching device includes a first relay, a second relay, and a third relay. The first relay has a first coil and a first contact, and the first coil is energized by a first voltage potential present between the first hot lead and the neutral. The second relay has a second coil and a second contact, and the second coil is energized by a second voltage potential present between the second hot lead and the neutral lead. The third relay has a third coil, a third contact, and a fourth contact, and the first contact and the second contact are connected in series with the third coil between the first hot lead and the second hot lead. The third contact is connected in series between the first hot lead and an electrical load and the fourth contact is connected in series between the second hot lead and the electrical load.

According to still another embodiment of the invention, a method for establishing an electrical connection between an electrical load and a split-phase power distribution system is disclosed. The split-phase power distribution system includes a first hot lead, a second hot lead, and a neutral lead with a first voltage potential existing between the first hot lead and the neutral lead, a second voltage potential existing between the second hot lead and the neutral lead, and a third voltage potential existing between the first hot lead and the second hot lead. The method includes the steps of closing a first switch when the first voltage potential is present between the first hot lead and the neutral lead and closing a second switch when the second voltage potential is present between the second hot lead and the neutral lead. The first switch is operatively connected between the first hot lead and the neutral lead, and the second switch is operatively connected between the second hot lead and the neutral lead. A third switch having a first terminal and a second terminal is closed to establish an electrical connection between either the first terminal or the second terminal of the third switch and either the first hot lead or the second hot lead of the split-phase power distribution system. The other terminal of the first terminal and the second terminal of the third switch is electrically connected to the other lead of the first hot lead and the second hot lead of the split-phase power distribution system.

These and other objects, advantages, and features of the invention will become apparent to those skilled in the art from the detailed description and the accompanying drawings. It should be understood, however, that the detailed description and accompanying drawings, while representative embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto may be used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 1:
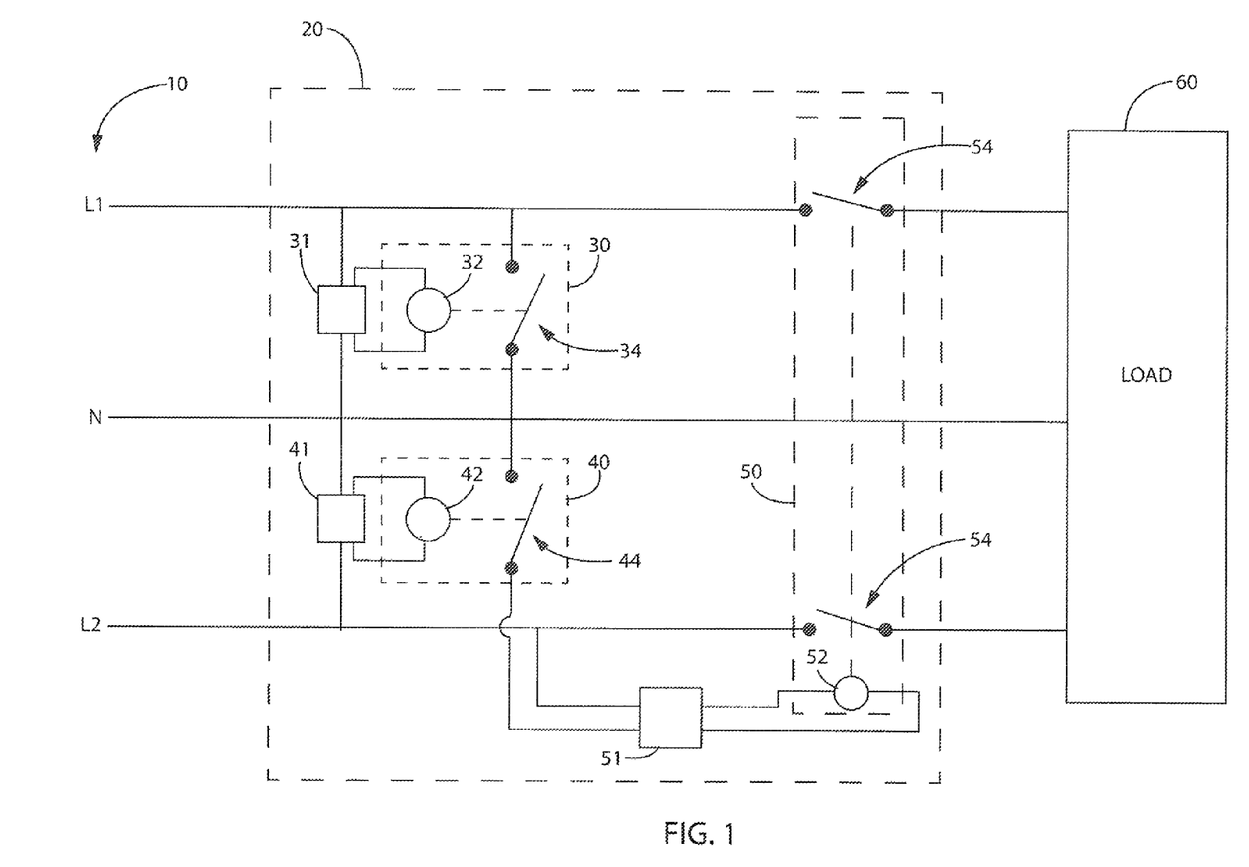
FIG. 1 is a schematic diagram of one embodiment of a switching device for connecting a if) power distribution system to an electrical load in accordance with the present invention.

Turning initially to FIG. 1, a split-phase electrical distribution system 10 includes a first hot lead L1, a second hot lead L2, and a neutral lead N, where the distribution system 10 may be, for example, a backup generator. A switching device 20 in accordance with the present invention connects the distribution system 10 to an electrical load 60. The electrical load 60 may be a single device or multiple devices and each device may be connected between the first hot lead L1 and the neutral lead N, the second hot lead L2 and the neutral lead N, or the first hot lead L1 and the second hot lead L2. According to the illustrated embodiment, the switching device 20 includes three switches 30, 40, 50. A first switch 30 is selectively enabled as a function of the voltage potential between the first hot lead L1 and the neutral lead N. A second switch 40 is selectively enabled as a function of the voltage potential between the second hot lead L2 and the neutral lead N. A third switch 50 is configured to selectively connect the first hot lead L1 and the second hot lead L2 to the electrical load when both the first switch and the second switch are enabled.

According to the illustrated embodiment, the first switch 30 is a relay having a first coil 32 and a first contact 34. The first coil 32 is operatively connected between the first hot lead L1 and the neutral lead N. The second switch 40 is a relay having a second coil 42 and a second contact 44. The second coil 42 is operatively connected between the second hot lead L2 and the neutral lead N. The third switch 50 is a relay having a third coil 52, a third contact 54, and a fourth contact 56. The third coil 52 is operatively connected in series with the first contact 34 and the second contact 44 between the first hot lead L1 and the second hot lead L2. The third contact 54 is connected in series with the first hot lead L1 between the distribution system 10 and the load 60, and the fourth contact 56 is connected in series with the second hot lead L2 between the distribution system 10 and the load 60.

According to one embodiment of the invention, each of the coils 32, 42, 52 are energized by a DC voltage. Relays 30, 40, 50 may include respective integral power supplies 31, 41, 51 which convert the voltage potential between a corresponding pair of the leads to a desired DC voltage required to energize the respective coils 32, 42, 52. In order for the integral power supplies 31, 41, 51 to operate, the supply and return paths to each of the power supplies 31, 41, 51 must be properly connected. For the first power supply 31, the first hot lead L1 and the neutral lead N must each be properly connected. For the second power supply 41, the second hot lead L2 and the neutral lead N must each be properly connected. For the third power supply 51, the first and second hot leads L1, L2 must each be properly connected. If the conduction path is not properly connected, the associated integral power supply 31, 41, 51 does not generate the necessary DC voltage and the associated relay 30, 40, 50 cannot energize the associated coil 32, 42, or 52. Thus, for the first and second power supplies 31, 41 to operate, the neutral conduction path must be properly connected. Each power supply 31, 41, 51 may be a separate logic circuit connected between at least one of the hot leads L1, L2 and/or the neutral lead N and configured to supply the required DC voltage to the corresponding relay 30, 40, 50. According to one embodiment of the invention, each logic circuit is a rectifier circuit converting an incoming AC voltage to the desired DC voltage.

According to another embodiment of the invention, a first portion of the coils 32, 42, 52 may be energized by the DC voltage and a second portion of the coils 32, 42, 52 may be energized by the AC voltage. For example, the first and second coils 32, 42 may be energized by DC voltage while the third coil 52 may be energized by AC voltage. The integral power supply 31, 41 may be provided to energize the first coil 32 and the second coil 42 with a DC voltage while the third coil 52 is energized by direct connection between the first and second hot leads L1, L2.

In operation, the switching device 20 is configured to connect the distribution system 10 to the electrical load 60 when the neutral conduction path is present between the distribution system 10 and the electrical load 60 and when the distribution system 10 is properly wired to the switching device 20.

Figure 2:
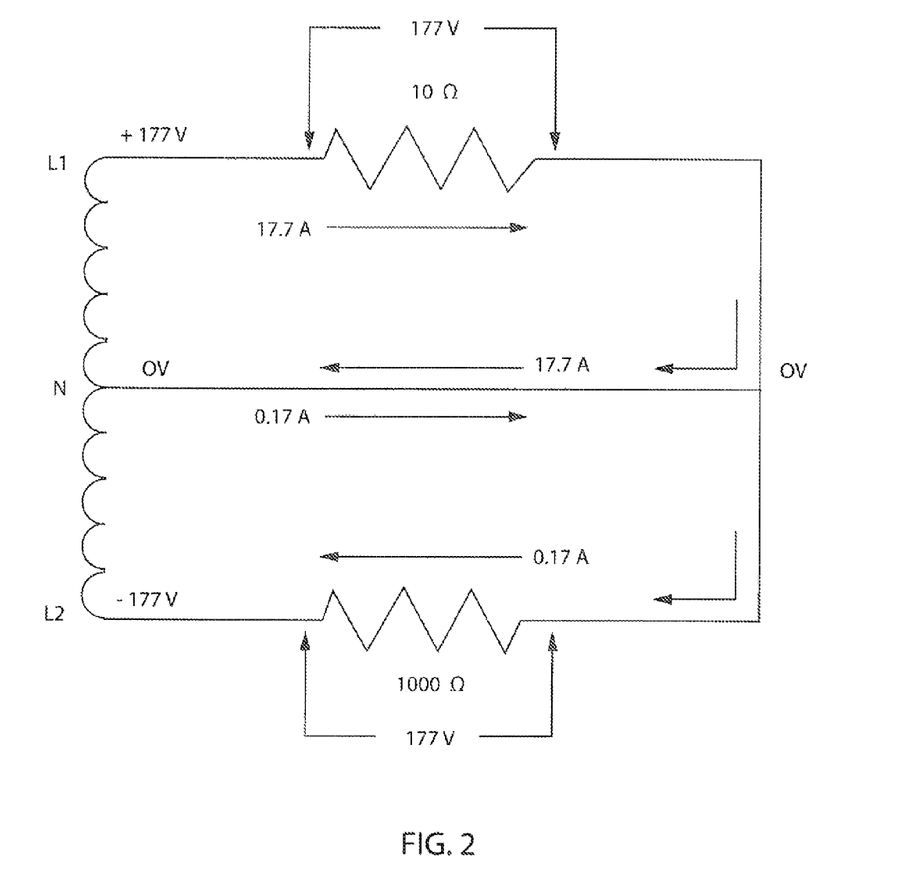
FIG. 2 is a schematic illustration of the voltage potential and currents present in one embodiment of the switching device in accordance with the present invention when the neutral connection is present.
Figure 3:
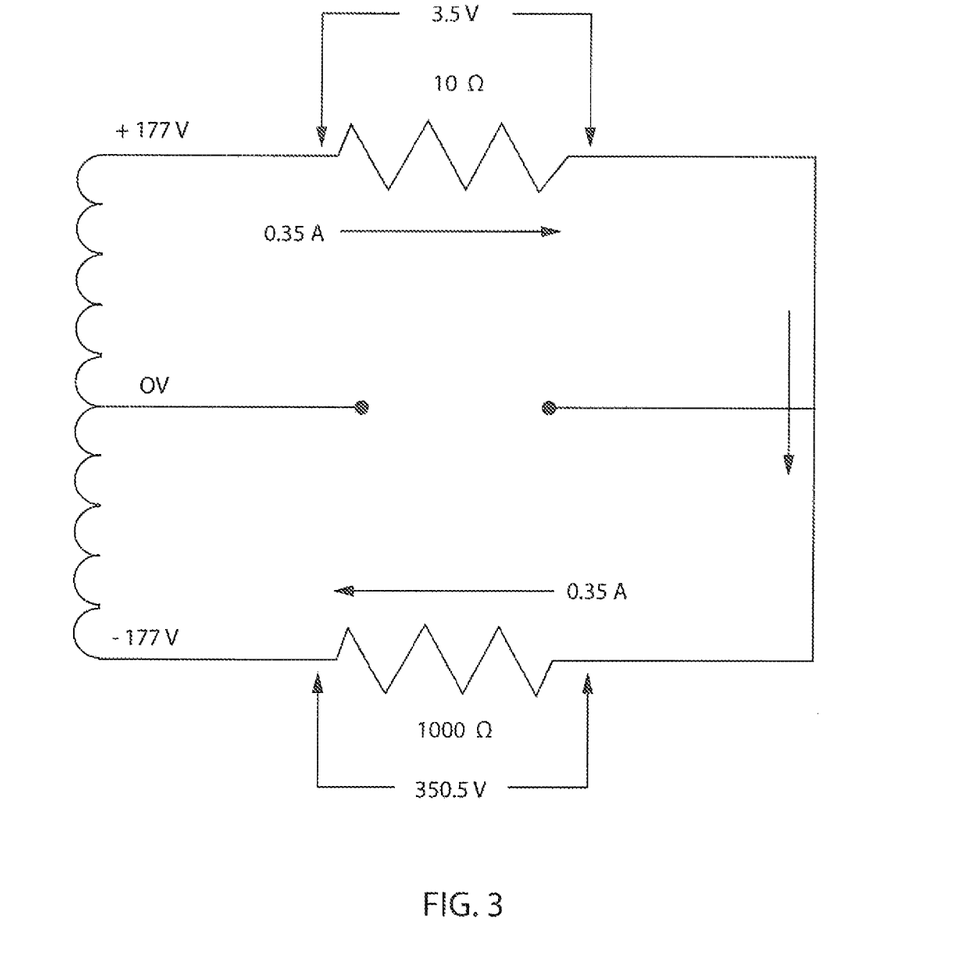
FIG. 3 is a schematic illustration of the voltage potential and currents present in one embodiment of the switching device in accordance with the present invention when the neutral connection is not present.

Referring to FIGS. 2 and 3, the voltage and current levels present on exemplary loads during normal operation and during open neutral operation are illustrated. In both figures, an exemplary load having a resistance of 10 ohms is shown connected across the first hot lead L1 and the neutral lead N and an exemplary load having a resistance of 1000 ohms is shown connected across the second hot lead L2 and the neutral lead N. Each load may be a single load or multiple loads represented by an equivalent resistance value. The distribution system 10 supplies 125 VAC between each of the hot leads L1, L2 and the neutral lead N and supplies 250 VAC between the two hot leads L1, L2. For ease of illustration, the peak value, 177 V, is illustrated with a negative sign at the second hot lead L2 representing a 180 degree phase shift between the AC voltage present at the first hot lead L1 and the AC voltage present at the second hot lead L2. In FIG. 2, the neutral connection is properly connected. The voltage potential seen across each of the exemplary loads is, therefore, 177 V, and the neutral connection provides a return path for the current flowing through each load. In FIG. 3, either a failure has occurred in the neutral connection or the neutral connection was not properly connected. As a result, the two loads define a voltage divider circuit where the voltage potential present across each load is proportional to the resistance value of each load. The peak voltage potential seen across the two hot leads L1, L2 is 354 V or twice the peak value (i.e. 177 V) on each phase. Because the resistance value of the second load is substantially higher than the resistance value of the first load, the majority of the voltage potential seen across the two hot leads L1, L2 is present across the second load. The presence of a voltage potential almost twice what is expected may cause damage or failure of the electrical devices that constitute the exemplary load.

When the neutral connection is properly connected, the switching device 20 connects the distribution system 10 to the load 60. When the 125 VAC is present between each hot lead L1, L2 and the neutral lead N, the first and the second power supplies 31, 41 energize the first and the second coils 32, 42, respectively. Because 125 VAC is present between each hot lead L1, L2 and the neutral lead N, both coils 32, 42 are energized and the respective normally open contacts 34, 44 are closed. The third coil 52 may be configured to be energized either by 250 VAC or by the third power supply 51 converting the 250 VAC to another AC or DC voltage suitable for energizing the third coil 52. With both the first contact 34 and the second contact 44 closed, the voltage potential between the two hot leads L1, L2 is present either at the input of the third power supply 51 or across the third coil 52. The third coil 52 is energized, closing the normally open third contact 54 and the normally open fourth contact 56. With the third contact 54 and fourth contact 56 closed, the distribution system 10 is electrically connected to the load 60. Thus, when the neutral connection is properly established, each of the contacts 34, 44, 54, 56 closes, connecting the distribution system 10 to the load 60.

When the neutral connection is not properly connected, the switching device 20 disconnects the distribution system 10 from the load 60. In order for each of the integral power supplies 31, 41, 51 to operate, their respective supply and return paths must be properly connected. If for example, the integral power supply includes a rectifier circuit, no current can flow through the input side if either the supply or return path is not connected. For each of the first and second power supplies 31, 41, the neutral lead N provides the return path. Thus, if the neutral connection is not properly made, each of the first and second power supplies 31, 41 will stop supplying voltage to the first or second coil 32, 42 and the first or second contact 34, 44 will open. If either the first contact 34 or the second contact 44 opens, the electrical connection to the third coil 52 is broken and the third coil 52 is de-energized. As a result, each of the third and fourth contacts 54, 56 open and the electrical connection between the distribution system 10 and the load 60 is opened. Thus, when the neutral connection fails or is not properly established, the switching device 20 disconnects the distribution system 10 from the load 60.

Figure 4:
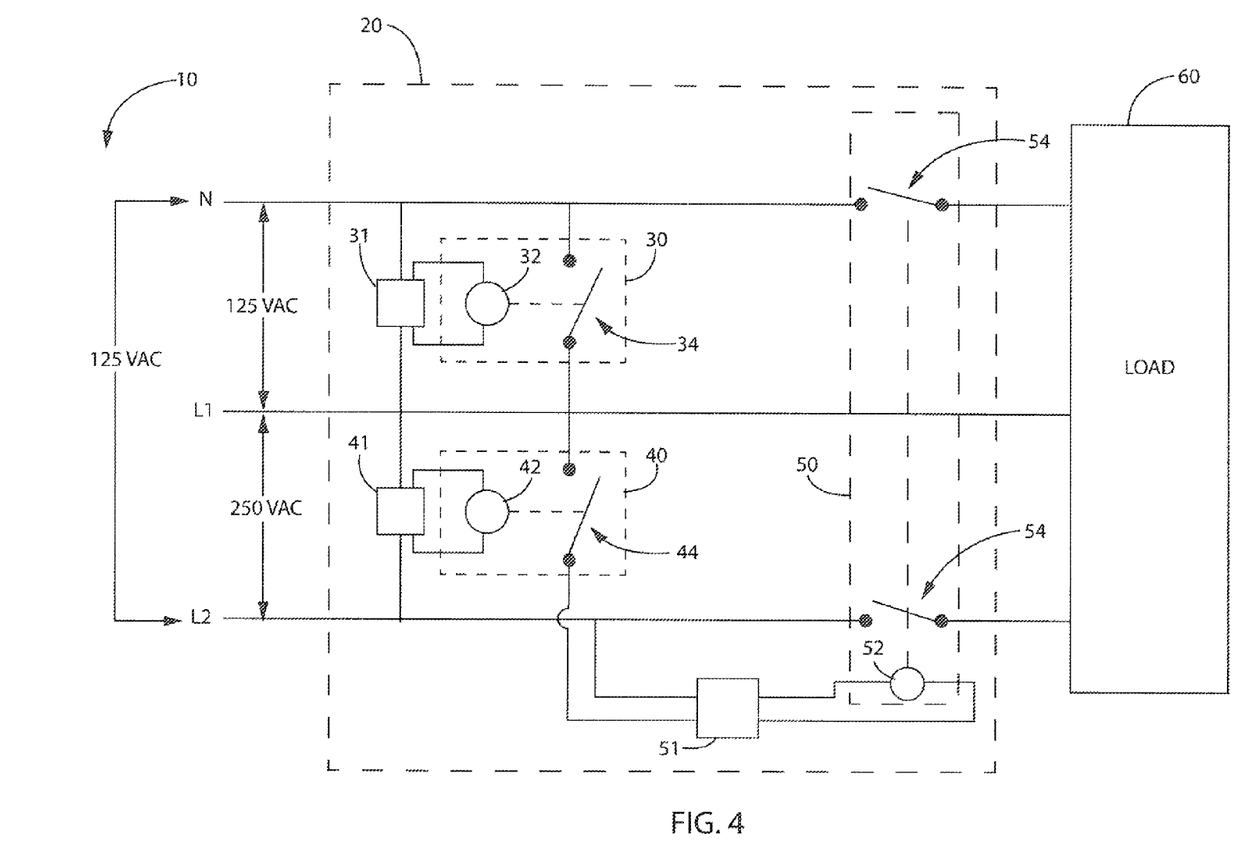
FIG. 4 is a schematic diagram of one embodiment of the switching device in accordance with the present invention illustrating improper wiring of the power source to the switching device.

In addition to providing protection against an open neutral condition, the switching device 20 also protects the load 60 from other improper wiring conditions. Referring next to FIG. 4, the first hot lead L1 and the neutral lead N are reversed at the connection to the switching device 20. The resulting voltage potentials for a 125/250 VAC split-phase distribution system 10 present across each power supply 31, 41, 51 are also illustrated. The magnitudes of the voltages are exemplary and it is contemplated that the switching device 20 may be implemented on split-phase distribution systems 10 having various other magnitudes of voltage. The first power supply 31 still receives the desired 125 VAC. The second relay 40; however, is now connected between the first hot lead L1 and the second hot lead L2 and receives 250 VAC. If the second power supply 41 includes devices rated to accept at least 250 VAC, it will still, function and energize the coil 42 in the second relay 40. As a result, the first contact 34 and second contact 44 will still close, connecting the third coil between the second hot lead L2 and the neutral connection N. However, the third power supply 51 receives only 125 VAC. If the third power supply 51 is configured to require 250 VAC to operate properly, the third coil 52 will remain de-energized and the third and fourth contacts 54, 56 remain open. As a result, the switching device 20 protects one of the hot leads L1, L2 from being swapped with the neutral lead N.

It should be understood that the invention is not limited in its application to the details of construction and arrangements of the components set forth herein. The invention is capable of other embodiments and of being practiced or carded out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various alternatives and embodiments are contemplated as being within the scope of the following claims, which particularly point out and distinctly claim the subject matter regarded as the invention.

I claim:

1. A switching device for connecting a power distribution system to an electrical load, the power distribution system having a first voltage potential between a first hot lead and a neutral lead and a second voltage potential between a second hot lead and the neutral lead, the switching device comprising:
a first switch selectively enabled as a function of the first voltage potential;
a second switch selectively enabled as a function of the second voltage potential; and
a third switch configured to selectively connect the first hot lead and the second hot lead to the electrical load when both the first switch and the second switch are enabled.

2. The switching device of claim 1 wherein a third voltage potential exists between the first hot lead and the second hot lead and wherein the third voltage potential is greater than both the first voltage potential and the second voltage potential.

3. The switching device of claim 2 wherein the third switch is selectively enabled as a function of the third voltage potential.

4. The switching device of claim 1 further comprising:
a first voltage supply operatively connected between the first hot lead and the neutral lead, wherein the first voltage supply is configured to enable the first switch when the first voltage potential is present between the first hot lead and the neutral lead and to disable the first switch when the first voltage potential is not present between the first hot lead and the neutral lead; and
a second voltage supply operatively connected between the second hot lead and the neutral lead, wherein the second voltage supply is configured to enable the second switch when the second voltage potential is present between the second hot lead and the neutral lead and to disable the second switch when the second voltage potential is not present between the second hot lead and the neutral lead.

5. The switching device of claim 4 wherein the first voltage supply is a first rectifier circuit and the second voltage supply is a second rectifier circuit.

6. The switching device of claim 1 wherein the first switch is a first relay, the second switch is a second relay, and the third switch is a third relay.

7. The switching device of claim 6 wherein the power distribution system comprises a split phase power distribution system, and wherein:
the first relay includes a first coil and a first contact, wherein the first coil is energized by a first voltage potential present between the first hot lead and the neutral lead of the split-phase power distribution system;
the second relay includes a second coil and a second contact, wherein the second coil is energized by a second voltage potential present between the second hot lead and the neutral lead of the split-phase power distribution system; and
the third relay includes a third coil, a third contact, and a fourth contact, wherein the first contact and the second contact are connected in series with the third coil between the first hot lead and the second hot lead and wherein the third contact is connected in series between the first hot lead and an electrical load and the fourth contact is connected in series between the second hot lead and the electrical load.

8. A switching device for protecting against an open neutral connection in a split-phase power distribution system having a first hot lead, a second hot lead, and a neutral lead, the switching device comprising:
a first relay having a first coil and a first contact, wherein the first coil is energized by a first voltage potential present between the first hot lead and the neutral lead;
a second relay having a second coil and a second contact, wherein the second coil is energized by a second voltage potential present between the second hot lead and the neutral lead; and
a third relay having a third coil, a third contact, and a fourth contact, wherein the first contact and the second contact are connected in series with the third coil between the first hot lead and the second hot lead and wherein the third contact is connected in series between the first hot lead and an electrical load and the fourth contact is connected in series between the second hot lead and the electrical load.

9. The switching device of claim 8 wherein a third voltage potential exists between the first hot lead and the second hot lead and wherein the third voltage potential is greater than both the first voltage potential and the second voltage potential.

10. The switching device of claim 9 wherein the third coil is energized by the third voltage potential.

11. The switching device of claim 8 further comprising:
a first voltage supply operatively connected between the first hot lead and the neutral lead, wherein the first voltage supply is configured to energize the first coil when the first voltage potential is present between the first hot lead and the neutral lead and to de-energize the first coil when the first voltage potential is not present between the first hot lead and the neutral lead; and
a second voltage supply operatively connected between the second hot lead and the neutral lead, wherein the second voltage supply is configured to energize the second coil when the second voltage potential is present between the second hot lead and the neutral lead and to de-energize the second coil when the second voltage potential is not present between the second hot lead and the neutral lead.

12. The switching device of claim 11 wherein the first voltage supply is a first rectifier circuit and the second voltage supply is a second rectifier circuit.

13. A method for establishing an electrical connection between an electrical load and a split-phase power distribution system, wherein the split-phase power distribution system includes a first hot lead, a second hot lead, and a neutral lead, with a first voltage potential existing between the first hot lead and the neutral lead, a second voltage potential existing between the second hot lead and the neutral lead, and a third voltage potential existing between the first hot lead and the second hot lead, the method comprising the steps of:
   closing a first switch when the first voltage potential is present between the first hot lead and the neutral lead, wherein the first switch is operatively connected between the first hot lead and the neutral lead;
   closing a second switch when the second voltage potential is present between the second hot lead and the neutral lead, wherein the second switch is operatively connected between the second hot lead and the neutral lead; and
   closing a third switch having a first terminal and a second terminal, wherein closing the first and second switches establishes an electrical connection between one of the first terminal and the second terminal of the third switch and one of the first hot lead and the second hot lead of the split-phase power distribution system and wherein the other terminal of the first terminal and the second terminal of the third switch is electrically connected to the other lead of the first hot lead and the second hot lead of the split-phase power distribution system.

14. The method of claim 13 wherein the first switch is a first relay having a first coil and a first contact, the second switch is a second relay having a second coil and a second contact, and the third switch is a third relay having a third coil, a third contact and a fourth contact.

15. The method of claim 14 wherein the split-phase power distribution system is an alternating current (AC) power system, the method further comprising the steps of:
   converting the first voltage potential to a first DC voltage with a first voltage supply operatively connected between the first hot lead and the neutral lead, wherein the step of closing the first switch includes the step of energizing the first coil with the first DC voltage; and
   converting the second voltage potential to a second DC voltage with a second voltage supply operatively connected between the second hot lead and the neutral lead, wherein the step of closing the second switch includes the step of energizing the second coil with the second DC voltage.

16. The method of claim 15 wherein the first voltage supply is a first rectifier circuit and the second voltage supply is a second rectifier circuit.

\* \* \* \* \*

UNITED STATES PATENT AND TRADEMARK OFFICE
CERTIFICATE OF CORRECTION

| | |
|---|---|
| PATENT NO. | : 8,891,219 B2 |
| APPLICATION NO. | : 13/911783 |
| DATED | : November 18, 2014 |
| INVENTOR(S) | : Czarnecki |

Page 1 of 1

It is certified that error appears in the above-identified patent and that said Letters Patent is hereby corrected as shown below:

IN THE CLAIMS

Claim 7, column 8, line 13, delete "a" and substitute therefor -- the --;

Claim 7, column 8, line 17, delete "a" and substitute therefor -- the --.

Signed and Sealed this
Third Day of March, 2015

Michelle K. Lee
*Deputy Director of the United States Patent and Trademark Office*